United States Patent
Bhowmik et al.

(10) Patent No.: US 12,541,394 B1
(45) Date of Patent: Feb. 3, 2026

(54) DISTRIBUTED PROCESSING OF PARTITIONED AND ORDERED DATA

(71) Applicant: Amazon Technologies, Inc., Seattle, WA (US)

(72) Inventors: Sayantan Bhowmik, Seattle, WA (US); Matthew Jonathan Narksusook, Auburn, WA (US); Adam Charles Siefker, Des Moines, WA (US); Francesco Maria Rizzi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 502 days.

(21) Appl. No.: 18/194,318

(22) Filed: Mar. 31, 2023

(51) Int. Cl.
G06F 9/48 (2006.01)
G06F 9/52 (2006.01)
G06F 16/14 (2019.01)
G06F 16/27 (2019.01)
G06F 16/903 (2019.01)
G06F 16/907 (2019.01)
G06F 16/9032 (2019.01)

(52) U.S. Cl.
CPC ............ G06F 9/4881 (2013.01); G06F 9/52 (2013.01); G06F 9/522 (2013.01); G06F 16/14 (2019.01); G06F 16/278 (2019.01); G06F 16/90348 (2019.01); G06F 16/907 (2019.01); G06F 16/144 (2019.01); G06F 16/9032 (2019.01)

(58) Field of Classification Search
None
See application file for complete search history.

(56) References Cited

U.S. PATENT DOCUMENTS

| 9,767,138 B2 | 9/2017 | Jaiswal et al. |
| 10,073,903 B1 | 9/2018 | Arye et al. |
| 2019/0258625 A1 | 8/2019 | Caudy et al. |

OTHER PUBLICATIONS

Khalilnejad et al., "Automated pipeline framework for processing of large-scale building energy time series data", Dec. 1, 2020, PLOS ONE, pp. 1-22. (Year: 2020).*

* cited by examiner

*Primary Examiner* — Qing Yuan Wu
(74) *Attorney, Agent, or Firm* — S. Scott Foster; Kowert, Hood, Munyon, Rankin & Goetzel, P.C.

(57) ABSTRACT

Scheduling of time-series data samples for processing according to client-specified criteria is performed. A client may submit a request to establish an execution pipeline to process time-series data, the request including a partitioning definition and an ordering definition. Responsive to this request, a scheduler may receive a time-series data sample and generate a partitioning key according to the partitioning definition to direct the sample to one of multiple partition queues. After enqueuing, the schedular may determine that the sample should be blocked from processing until satisfaction of an unblocking condition is achieved. This satisfaction may include processing of one or more other samples according to the ordering definition or a time period has elapsed. Blocking criteria may also include limitations in a number of simultaneously executing sample processes. Processing of samples of different queues may occur independently.

20 Claims, 8 Drawing Sheets

DISTRIBUTED PROCESSING OF PARTITIONED AND ORDERED DATA

BACKGROUND

Time-series data may be captured and stored in a distributed time-series database from multiple data sources over unreliable or unpredictable network connections. Clients of cloud-based time-series database services may desire to provide customized definitions for scaling and processing of time-series data during the ingestion, or acquisition, phase. Furthermore, due to the nature of networking connections, time-series data samples may arrive for ingestion out of a desirable processing order, and this processing order may interact with partitioning schemes for the time-series data customized by clients of the service.

Figure 1:
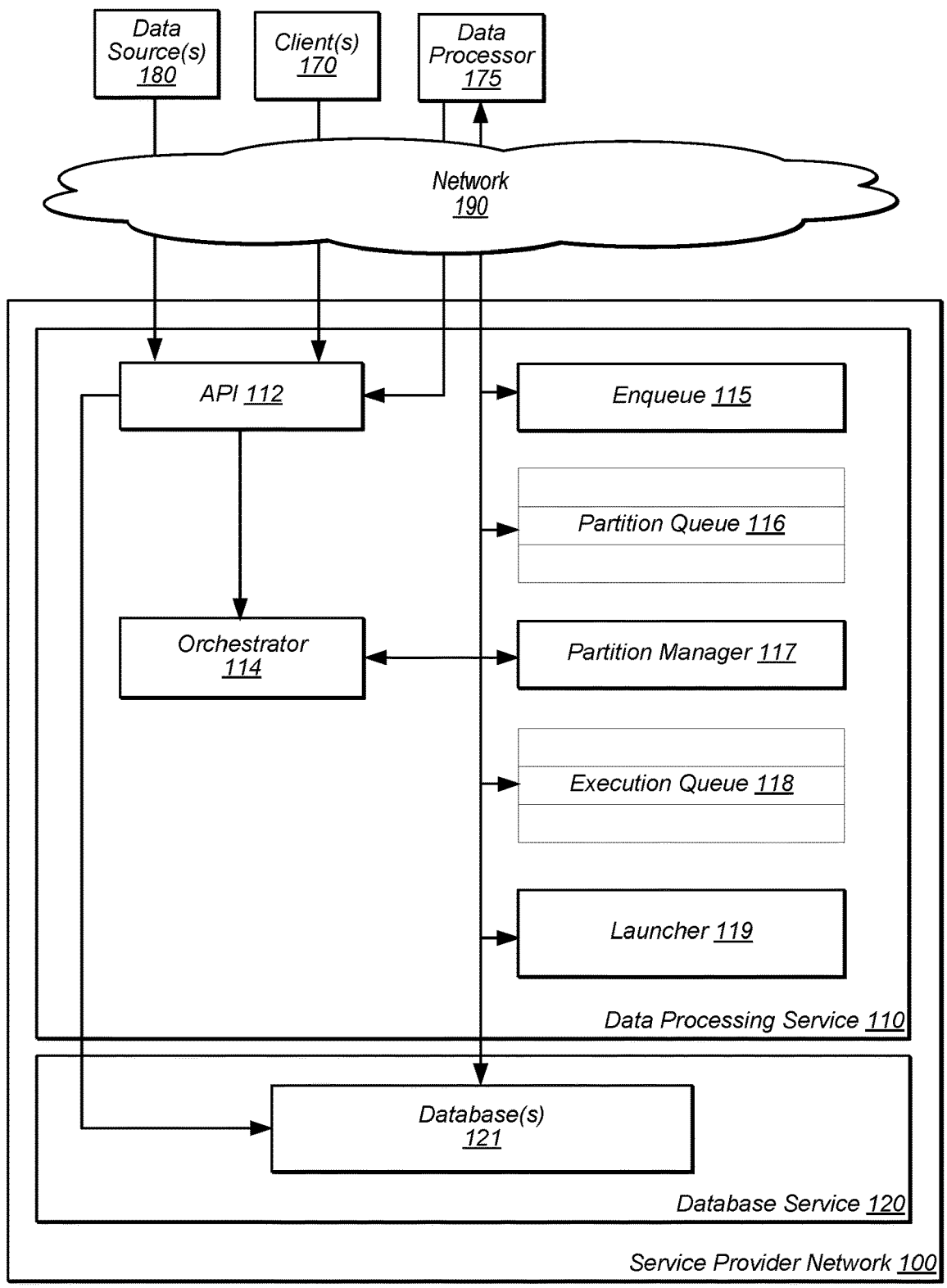
FIG. 1 is a block diagram of an architecture for a system that implements distributed processing of partitioned and ordered data, according to at least some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Time-series data may be captured and stored in distributed time-series databases from multiple data sources over unreliable or unpredictable network connections. Clients of cloud-based time-series database services may need to provide customized definitions for scaling and processing of time-series data during the ingestion, or acquisition, phase. Furthermore, time-series data samples may arrive for ingestion out of a desirable processing order, and this processing order may interact with partitioning schemes for the time-series data customized by clients of the service.

Embodiments of methods, systems, and computer-readable media for scheduling of time-series data samples for processing according to client-specified criteria are disclosed. A client may submit a request to establish an execution pipeline to process time-series data, the request including at least a partitioning definition and an ordering definition. Responsive to this request, a scheduler may receive time-series data samples and generate respective partitioning keys according to the partitioning definition to direct the samples to respective ones of multiple partition queues. After enqueuing, the schedular may determine that a sample should be blocked from processing until satisfaction of an unblocking condition is achieved. This satisfaction may include processing of one or more other samples according to the ordering definition or a time period has elapsed. Blocking criteria may also include limitations in a number of simultaneously executing sample processes. Processing of samples of different queues may occur independently.

FIG. 1 is a block diagram of an architecture for a system that implements distributed processing of partitioned and ordered data, according to at least some embodiments. Various components illustrated in FIG. 1 may perform functionality illustrated in FIGS. 2-6, as described below.

Illustrated is a Provider Network 100 that may include various services including a time-series data scheduling service 110 and a database service 120, over computer network(s) 190. Client(s) 170 of a data scheduling service 110 may submit requests to create, destroy, modify, monitor and manage execution pipelines or workflows for processing of time-series data to be stored in a time-series database 121 via one or more application programming interfaces (APIs) 112. The data scheduling service 110 may include various processing components such as an enqueue module 115, partition manager 117, launcher 119 and orchestrator 114, in some embodiments. These various components may be implemented using a variety of computing techniques to provide a scalable processing or ingestion service for time-series data. In some embodiments, for example, the data scheduling service 110 may be implemented as a distributed application using virtual computing resources of a compute service of the service provider network 100, as shown below in FIG. 7. In other embodiments, various components of the data scheduling service 110 may be implemented using ephemeral computing services of the service provider network 100 to provide demand execution of processing phases of the data scheduling service 110. These examples, however, is not intended to be limiting and any number of implementations may be imagined.

Time-series data from data source(s) 180 (e.g., measurements generated over time and individually annotated with time and date) may be received by a time-series database 121 and stored in storage tiers. The time-series data in the storage tier(s) may then be available for queries performed by a fleet of query processors. A time series may include a sequence of data points representing different points in time. A data point may include a measurement, a timestamp including time and data, and any number of additional attributes. Any given contiguous subset of such data points may represent a segment of the time series. As received and stored by the time-series database, a time series may thus represent a sequence of discrete data points that define different values for a measurement at a finite number of points in time.

Time-series data stored in a database may be naturally ordered by acquisition time. However, individual time-series datum values may be acquired and processed for inclusion in a time-series database in arbitrary order, including no order at all. For this reason, it may be desirable for clients 170 to define a custom order definition as part of processing of time series data values for inclusion in the database 121. For example, a custom ordering for processing may include, in addition to acquisition time and date, a consideration of data source 180. This example, however, is not intended to be limiting and many custom orderings for processing may be imagined.

Furthermore, time-series data may be partitioned or sharded to improve scalability in processing of the time-series data and storage within the database 121. For this reason, it may be desirable for clients 170 to define a custom partitioning or sharding definition as part of processing of time series data values for inclusion in the database 121. Furthermore, partitioning of the time-series data may influence the ordering definition described above, in some embodiments. In addition, it may be desirable for clients 170 to define other custom definitions as part of processing of time series data values for inclusion in the database 121, such as a degree of parallelism of processing execution for a partition of the time-series data. This example, however, is not intended to be limiting and many custom definitions for processing may be imagined. Thus, client(s) 170 of a data scheduling service 110 may submit requests to create, destroy, modify, monitor and manage execution pipelines or workflows for processing of time-series data via one or more application programming interfaces (APIs) 112 to include these custom definitions, including partitioning, ordering and other definitions, in various embodiments.

The data scheduling service 110 may, responsive to receiving such requests via the API 112, store, delete or update these various pipeline definitions in a configuration database 121. Subsequent processing of time-series data may then access these stored definitions in the processing of time series data values for inclusion in the database 121.

A time-series database 121 may ingest and store time-series data and make the stored data available for queries. Elements of the time-series data may be received by the database 100 from clients 190 over time, e.g., as one or more streams of time-series data. Data source(s) 180 may represent various types of client devices that generate or otherwise provide data in various time series to a database 121. A time series may include a set of values that change over time, such as sensor measurements or system metrics, and that are timestamped or otherwise positioned along a temporal axis. For example, a set of data sources 180 may repeatedly gather information such as vibration, temperature, and pressure using sensors. As another example, a set of data sources 180 may detect state transitions, e.g., in a computer network.

Data sources 180 that provide the time-series data to the database may be associated with various domains such as Internet of Things (IoT) and "smart home" networks, autonomous vehicles, manufacturing facilities, distribution facilities, computational resources in a multi-tenant provider network, facilities management systems, stock trading systems, and so on. Some time series or hierarchies of time series may include very large numbers of measurements. For example, a multi-tenant provider network may monitor trillions of time-series events per day. As another example, a fulfillment center for an online store may have thousands of sensors that monitor the state of equipment, goods, and software. In order to efficiently ingest, transform, store, and/or query such large quantities of data, a distributed database 121 may employ scaling techniques while keeping the database online for continued ingestion and querying. By decoupling various stages of a distributed database from each other, individual portions of the database may be scaled up or down to make better use of computational and storage resources while permitting near-real-time ingestion and querying of time-series data.

To create a time-series datum in a database 121, a data source 180 may submit a processing request including the datum, or time-series data value, to an enqueue module 115 via API 112. The time-series data value may include various metadata, or attributes, including a timestamp, a data value type, a data source identifier, and so on. These examples, however, is not intended to be limiting and other metadata for time-series data values may be imagined. Some of the metadata may be assigned by the data source while other metadata may be assigned by the enqueue module and still other metadata assigned or updated during processing of the time series data values for inclusion in the database 121, in various embodiments.

To enqueue the received processing request, the enqueue module 115 may apply partition definitions stored in a database 121 to generate a partition key for the processing request, the partition key generated according to a stored partition definition and various attributes or metadata of the time-series data value, in some embodiments. This partition key may then be used to identify a particular partition, or shard, to which to enqueue the processing request. The enqueue module may then enqueue the processing request on a particular partition queue 116 of a plurality of queues according to the partition key. Processing of requests of different partition queues may occur independently, in some embodiments. The enqueue process is described in further detail below in FIG. 3.

A partition manager 117 may then access the partition queue 116 to determine when to process the time-series data responsive to the enqueued request. To make this determination, the partition manager may access an ordering definition for the execution pipeline as stored in the database 121. This determination ultimately results in the transferring of the enqueued request from the partition queue 116 to an execution queue 118, in some embodiments. This process is described in further detail below in FIG. 4.

A launcher module 119 may then access the execution queue 118 to process the time-series data responsive to the request. To process the data, the launcher module 119 may wait for availability of the orchestrator 114 to perform the processing, the orchestrator coordinating the processing using data processor 175. This launching process is described in further detail below in FIG. 5. In some embodiments, upon completion of processing if the data, data processor 175 may signal availability of the processed data using API 112.

In addition, in some embodiments the various modules of the data scheduling service 110 may interact with the database 121 to create and update log records for individual ones of enqueued and processed time-series data in order to provide a history of time-series data provided for queries by the database 121. This process is described in further detail below in FIGS. 2-5.

Figure 2:
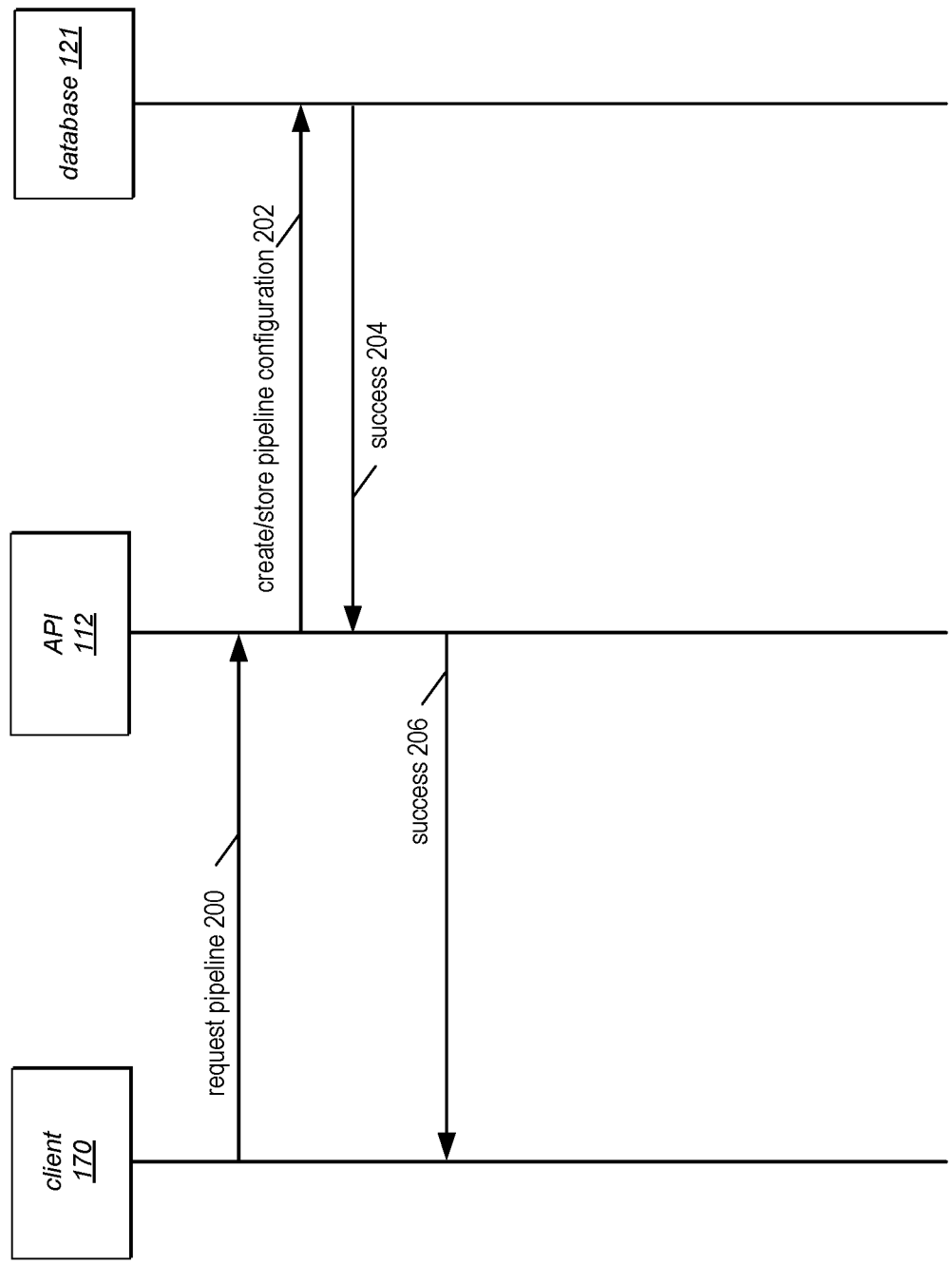
FIG. 2 is a timing diagram that illustrates a create process of an execution pipeline for distributed processing of partitioned and ordered data, according to at least some embodiments.

FIG. 2 is a timing diagram that illustrates a create process of an execution pipeline for distributed processing of partitioned and ordered data, according to at least some embodiments. A client 170 of a time-series data scheduling service, such as the data scheduling service 110 of FIG. 1, may submit a request 200 to create, destroy, modify, monitor and manage an execution pipeline or workflow for processing of time-series data to an application programming interface (API), such as the API 112 of FIG. 1, to create, remove or modify a pipeline configuration including definitions such as partitioning, ordering and other definitions, in various embodiments. Responsive to receiving this request, the API 112 may cause the creation of a pipeline and store the pipeline configuration 202 in a database 121. Upon completion of storing the pipeline configuration, the database 121 may return a successful completion status 204 to the requesting API 112 which may then return a successful completion status 206 to the client 170.

Figure 3:
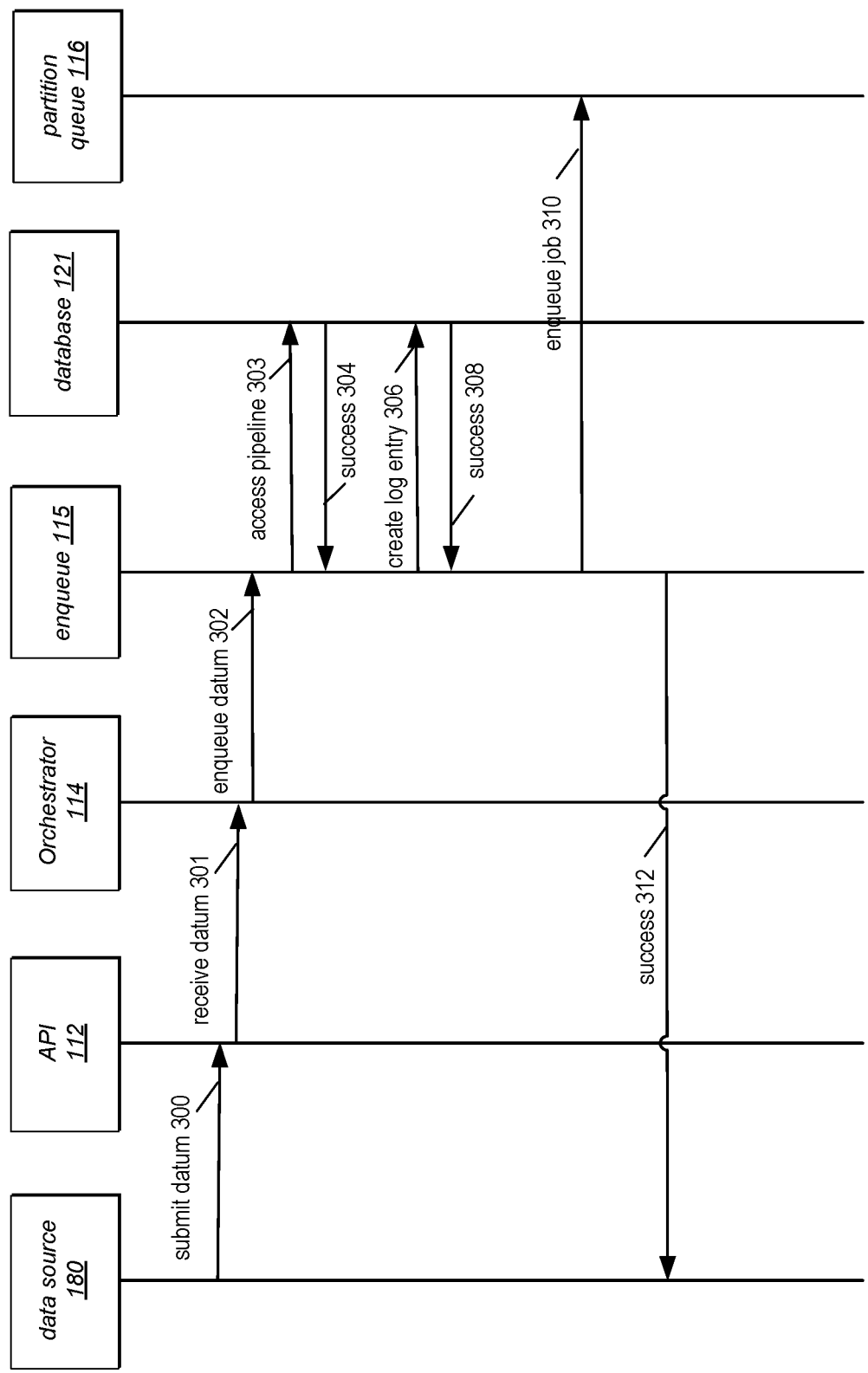
FIG. 3 is a timing diagram that illustrates an enqueue process of an execution pipeline for distributed processing of partitioned and ordered data, according to at least some embodiments.

FIG. 3 is a timing diagram that illustrates an enqueue process of an execution pipeline for distributed processing of partitioned and ordered data, according to at least some embodiments. A data source 180 of a time-series data scheduling service, such as the data scheduling service 110 of FIG. 1, may submit a time-series datum or data value 300, via API 112, to be processed for inclusion as time-series data in a database 121, in various embodiments. Responsive to receiving this datum, the orchestrator 114 may receive the datum 301 and enqueue the datum 302 to an enqueuing module 115, in some embodiments. The enqueue module 115 may then, in some embodiments, access 303 the database 121 to obtain pipeline configurations applicable to the received datum. Upon completion of the access, the database 121 may return a successful completion status 304 to the requesting enqueue module 116.

The enqueue module 115 may then create a log entry 306 for the datum in an event log or history that is stored in the database 121. Upon completion of creating the log entry, the database 121 may return a successful completion status 308 to the requesting enqueue module 116.

The enqueue module 115 may then in some embodiments apply a relevant partition definition from the accessed pipeline configurations stored in a database 121 to generate a partition key for the datum, the partition key generated according to a stored partition definition and various attributes or metadata of the time-series data value, in some embodiments. This partition key may then be used to identify a particular partition, or shard, to which to enqueue a processing request including the datum, in some embodiments. The enqueue module 115 may then enqueue 310 the processing request on a particular partition queue 116 of a plurality of queues according to the partition key. Upon completion of the enqueuing, the enqueue module 115 may return a successful completion status 312 to the data source 180.

Figure 4:
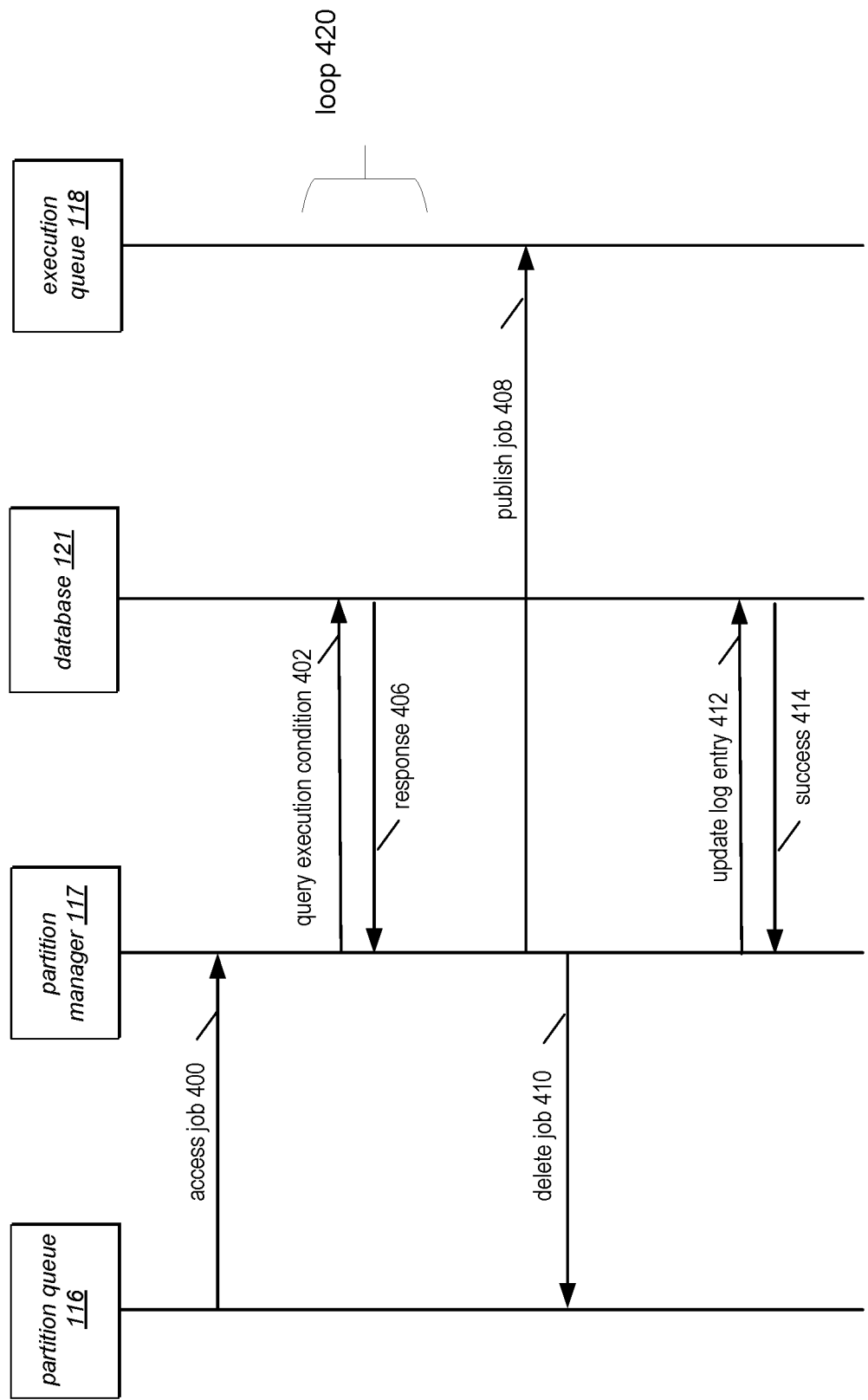
FIG. 4 is a timing diagram that illustrates a wait process of an execution pipeline for distributed processing of partitioned and ordered data, according to at least some embodiments.

FIG. 4 is a timing diagram that illustrates a wait process of an execution pipeline for distributed processing of partitioned and ordered data, according to at least some embodiments. A pipeline configuration may include various definitions governing a processing sequence for time-series data of a particular partition, in some embodiments. A partition manager 117 may access 400 a processing job 400 on a partition queue 116, in some embodiments. The partition manager 117 may then query 402 a database 121 to determine if execution condition(s) for the processing job are satisfied. A response to the query 406 is returned indicating whether the execution condition(s) for the processing job are satisfied. This query 402 and response 406 may be repeated in a loop 420 until the execution condition(s) are satisfied, in some embodiments.

In some embodiments, the loop 420 may not continue indefinitely. For this reason, as maximum waiting duration may be employed. If a waiting process implemented by the loop 410 exceeds the maximum waiting duration then the execution condition is satisfied and the loop 420 may be concluded. The maximum waiting duration may be configured for all partitions of the time-series data scheduling service in some embodiments or may be configured by the client as part of a pipeline configuration, in other embodiments.

In some embodiments, processing of jobs for a particular partition queue may have a maximum limit of parallelism. For example, processing of jobs for a partition queue may be required to be performed sequentially. If a number of jobs currently being processed meets a maximum number of simultaneous processing jobs, then it may be determined that the execution condition is not satisfied, in some embodiments. The maximum number of simultaneous processing jobs may be configured for all partitions of the time-series data scheduling service in some embodiments or may be configured by the client as part of a pipeline configuration, in other embodiments.

In some embodiments, processing of jobs for a particular partition queue may proceed in a particular order according to a client-provided ordering definition of the pipeline configuration. As the client-provided ordering definition and partitioning definition may include data from multiple data sources in a single partition and specify ordering using any number of datum attributes, and as arrival of time-series data may occur over network connections that do not guarantee arrival order and may not guarantee arrival at all, arrival of a particular datum in the partition queue may occur out of order. In the event the processing job in the partition queue is determined to be out of order, then it may be determined that the execution condition is not satisfied, in some embodiments. Subsequent executions of the loop 420 may then occur after processing of other processing jobs in the partition queue 116, resulting in a future determination that the processing job in the partition queue is in order and that the execution condition is satisfied, in some embodiments.

Upon determining that the execution condition(s) are satisfied, the partition manager 117 may then publish 408 the processing job on the execution queue 118 and delete the job 410 from the partition queue 116, in some embodiments.

The partition manager 117 may then update 412 the log entry for the datum in the event log or history that is stored in the database 121. Upon completion of the updating of the log entry, the database 121 may return a successful completion status 414 to the requesting partition manager 117.

Figure 5:
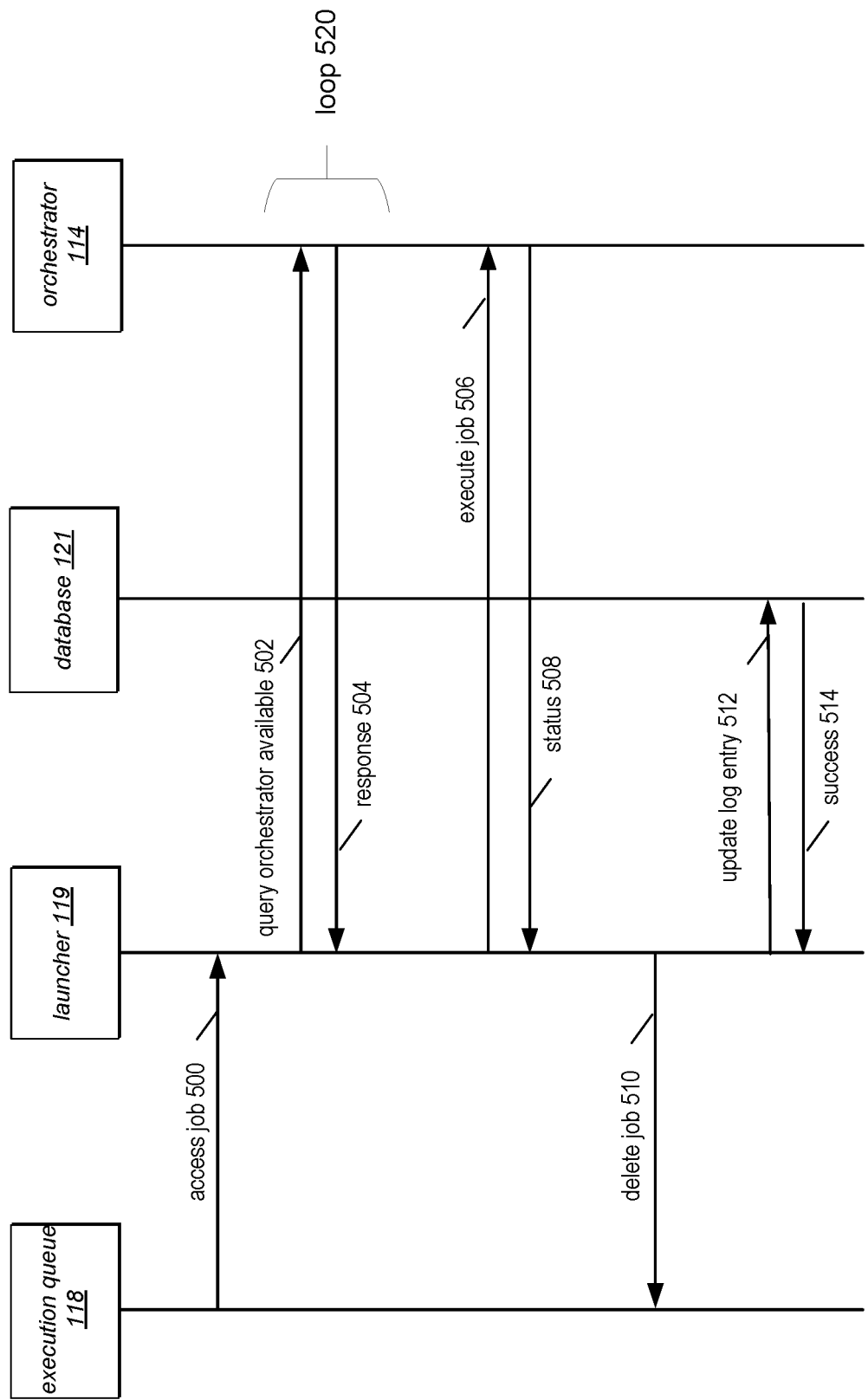
FIG. 5 is a timing diagram that illustrates a launch process of an execution pipeline for distributed processing of partitioned and ordered data, according to at least some embodiments.

FIG. 5 is a timing diagram that illustrates a launch process of an execution pipeline for distributed processing of partitioned and ordered data, according to at least some embodiments. A launcher module 119 may access 500 a processing job on an execution queue 118, in some embodiments. The launcher module 119 may then query 502 the availability of an orchestrator 114 for performing the processing job. A response to the query 402 is returned indicating whether the orchestrator is available. This query 502 and response 504 may be repeated in a loop 520 until the orchestrator is available, in some embodiments.

The launcher module 119 may then execute 506 the processing job using the orchestrator 114, with the orchestrator 114 returning a completion status 508 for the processing of the job, in some embodiments. Upon completion of processing, the launcher module 119 may then delete the job 510 from the execution queue 118, in some embodiments.

The launcher module 119 may then update 512 the log entry for the datum, to include the completion status for processing, in the event log or history that is stored in the database 121. Upon completion of the updating of the log entry, the database 121 may return a successful completion status 514 to the requesting launcher module 119.

Figure 6:
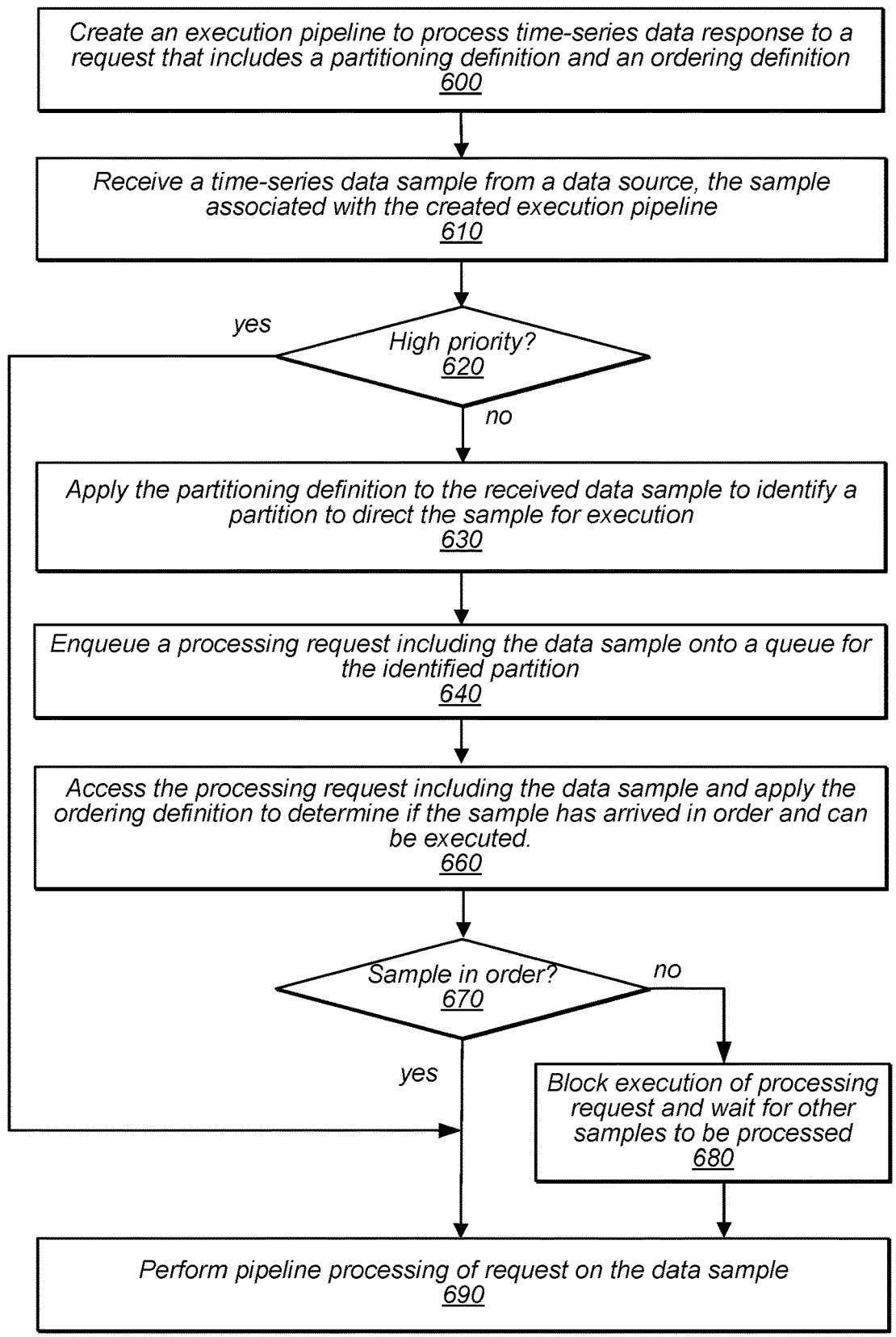
FIG. 6 is a diagram illustrating the process of enqueuing and distributed processing of partitioned and ordered data, according to at least some embodiments.

FIG. 6 is a diagram illustrating the process of enqueuing and distributed processing of partitioned and ordered data, according to at least some embodiments. The process begins at step 600 where an execution pipeline or workflow may be created to process time-series data. In some embodiments, this creation may occur responsive to request from a client, such as the client 170 of FIG. 1, of a time-series data scheduling service, such as the data scheduling service 110 of FIG. 1, where the request may include pipeline configuration information such as a partitioning definition and an ordering definition.

After creation of the execution pipeline, a time-series data scheduling service may receive, at step 610, a time-series data sample, or datum, from a data source, such as the data source 180 of FIG. 1, where the received sample is associated with the created execution pipeline. The received sample may include a measurement, a timestamp including time and data, and any number of additional attributes.

As shown in 620, a determination may be made in some embodiments if the data sample is to be processed at high priority. If the data sample is to be processed at high priority, as indicated by a positive exit condition at 620, the process may advance to step 690. If the data sample is not to be processed at high priority, as indicated by a negative exit from 620, then the process may advance to step 630 where a partition definition for the associated execution pipeline may be applied to generate a partition key for the datum, the partition key generated according to a partition definition and various attributes or metadata of the time-series data sample, in some embodiments. This partition key may then be used to identify a particular partition, or shard, to which to enqueue a processing request including the data sample, in some embodiments.

Then, as shown in 640, a processing request including the data sample may be enqueued on the identified partition queue of a plurality of queues according to the partition key. Subsequent to enqueuing the processing request, the request may be accessed from the queue, as shown in 660, by a partition manager for the partition queue to determine if the request is processible according to an ordering definition of the associated processing pipeline, in some embodiments.

In some embodiments, processing of jobs for a particular partition queue may proceed in a particular order according to a client-provided ordering definition of the pipeline configuration. As the client-provided ordering definition and partitioning definition may include data from multiple data sources in a single partition and specify ordering using any number of datum attributes, and as arrival of time-series data may occur over network connections that do not guarantee arrival order and may not guarantee arrival at all, arrival of a particular datum in the partition queue may occur out of order. In the event the processing job in the partition queue is determined to be out of order, then it may be determined that the execution condition is not satisfied, in some embodiments.

To determine if the request is processible, the ordering definition may be applied to various attributes or metadata of the time-series data sample, in some embodiments. If the data sample is determined to be in order, as indicated by a positive exit at step 670, the process may continue to step 690. If the data sample is determined to be out of order, as indicated by a negative exit at step 670, the process may continue to step 680.

As shown in step 680, if the sample is determined to be out of processing order according to the ordering definition, the processing request may be blocked until the ordering definition can be satisfied. While the processing request is block, processing of other processing jobs for the partition may be performed, resulting in a future determination that the processing job is in order and that the ordering condition is satisfied, in some embodiments. Once the ordering condition is satisfied, the process may continue to step 690.

In some embodiments, the waiting may not continue indefinitely. For this reason, as maximum waiting duration may be employed. If a waiting process implemented at step 680 exceeds the maximum waiting duration then the process may proceed to step 690. The maximum waiting duration may be configured for all partitions of the time-series data scheduling service in some embodiments or may be configured by the client as part of a pipeline configuration, in other embodiments.

As shown in step 690, once the ordering definition of the pipeline is satisfied, or in some embodiments a maximum waiting duration has been met, the processing request may be satisfied by processing the data sample, in some embodiments.

Figure 7:
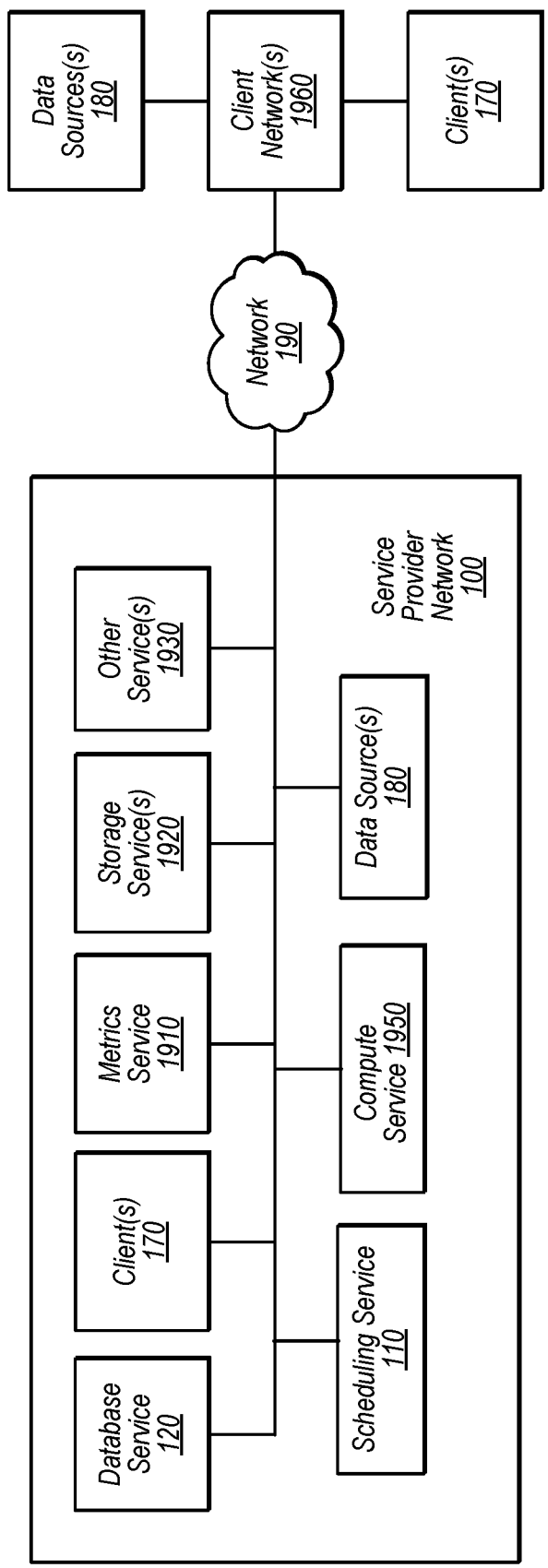
FIG. 7 is a block diagram illustrating a service-provider based architecture for a system that implements distributed processing of partitioned and ordered data, according to at least some embodiments.

FIG. 7 is a block diagram illustrating a service-provider based architecture for a system that implements combined active and pre-initialized resource management for rapid auto-scaling, according to at least some embodiments. In the illustrated embodiment, data scheduling service 110 and compute service 1950 are services provided by service provider network 100.

Service provider network 100 is illustrated as providing numerous other services 1930, such as, but not limited to, a database service 120 (providing relational, non-relational database services, or both), storage service(s) 1920 (e.g., key-value store, short-term, long-term, or the like, etc.), metrics service 1910 (e.g., obtaining, aggregating and storing metrics about the various services of the service provider network) and clients 170. Clients 170 are illustrated as both external (communicably coupled via client networks 1960 and intermediate network 190 (e.g., the Internet or similar) to the service provider network) and internal to the service provider network. In some embodiments, one of the services of the service provider network may be a client of another one of the services. Also shown are data source(s) 180 which, as with the clients 170, are illustrated as both external (communicably coupled via client networks 1960 and intermediate network 190 (e.g., the Internet or similar) to the service provider network) and internal to the service provider network.

Illustrative System

Figure 8:
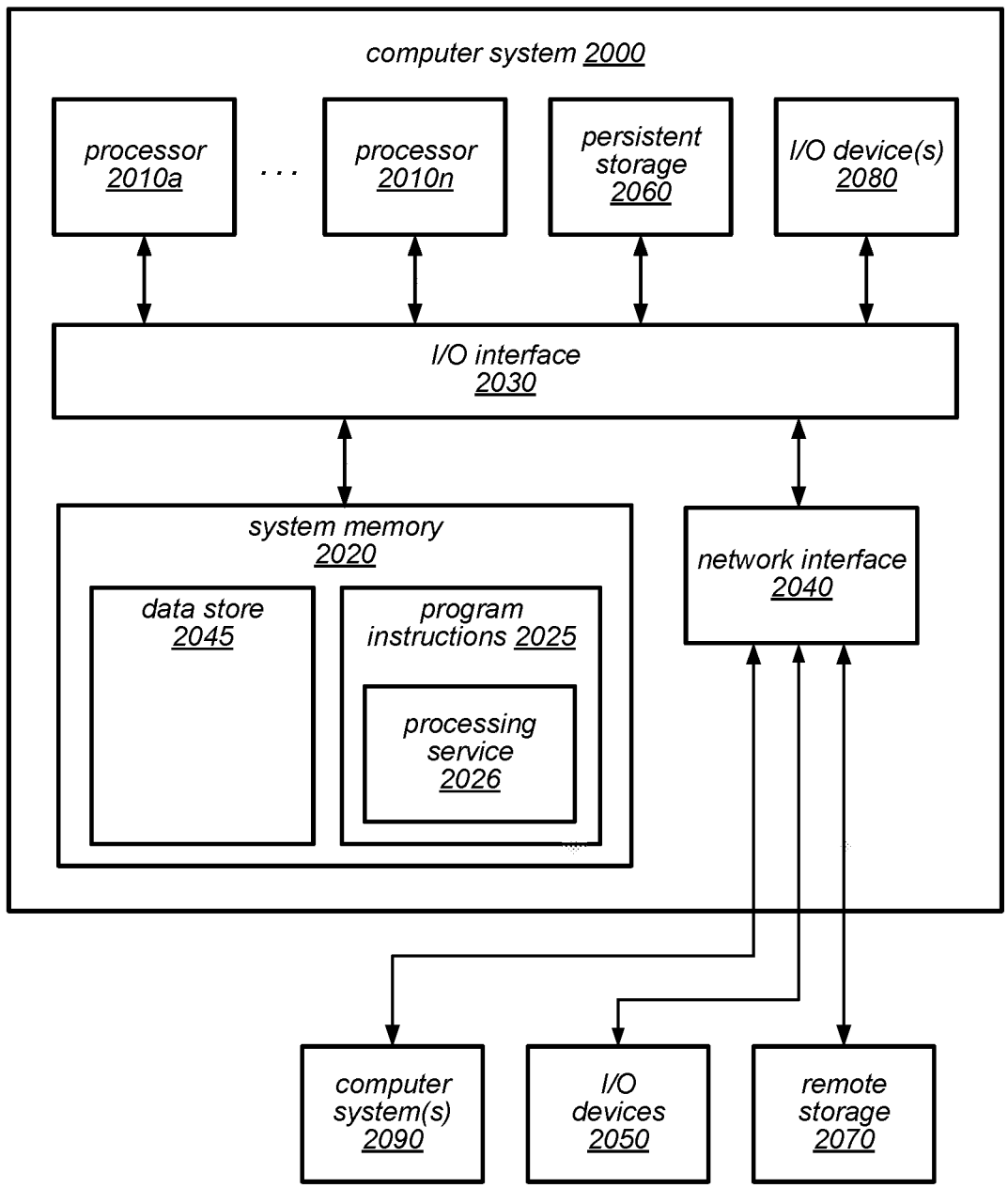
FIG. 8 is a block diagram illustrating an example computer system that may be used in some embodiments of a system that implements distributed processing of partitioned and ordered data, according to at least some embodiments.

Any of various computer systems may be configured to implement processes associated with a technique for multi-region, multi-primary data store replication as discussed with regard to the various figures above. FIG. 8 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various ones of the illustrated embodiments may include one or more computer systems 2000 such as that illustrated in FIG. 8 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the embodiments described herein. In another example, an instance of a server application executing on computer system 2000 may use network interface 2040 to communicate with other instances of the server application (or another server application) that may be implemented on other computer systems (e.g., computer systems 2090).

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques as described above for a scheduling service as indicated at 2026, for the downloadable software or provider network are shown stored within system memory 2020 as program instructions 2025. In some embodiments, system memory 2020 may include data store 2045 which may be configured as described herein.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 2030. A computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Embodiments of decentralized application development and deployment as described herein may be executed on one or more computer systems, which may interact with various other devices. FIG. 14 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may be a storage host, and persistent storage 2060 may include the SSDs attached to that server node.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or May be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   one or more processors; and
   a memory storing program instructions that, when executed on the one or more processors, implement a scheduling service configured to:
   create an execution pipeline to process time-series data responsive to receipt of a request comprising a partitioning definition and an ordering definition;
   receive a time-series datum for executing by the execution pipeline;
   route the time-series datum to a queue of a plurality of queues according to the partitioning definition;
   identify that the time-series datum has been routed to the queue out of order according to the ordering definition; and
   block executing of the time-series datum until satisfaction of an unblocking condition is determined, wherein the unblocking condition comprises one or more of:
   routing of time-series data to the queue to be processed before the time-series datum according to the ordering definition; and
   a maximum blocking time for the queue.

2. The system of claim 1, wherein executing of the time-series data is independent of executing of time-series data routed to respective queues of the plurality of queues other than the queue.

3. The system of claim 1, wherein the request further comprises an execution definition, and wherein the scheduling service is further configured to:
   block executing of the time-series datum until the execution condition is satisfied.

4. The system of claim 1, wherein the partitioning definition comprises a client-defined partitioning key based at least in part on one or more attributes of the time-series datum.

5. A method, comprising:
   creating a workflow to process time-series data responsive to receipt of a request comprising a partitioning definition and an ordering definition;
   receiving a time-series datum for processing by the workflow;
   routing the time-series datum to a queue of a plurality of queues according to the partitioning definition;
   identifying that the time-series datum has been routed to the queue out of order according to the ordering definition; and
   blocking processing of the time-series datum until satisfaction of an unblocking condition is determined.

6. The method of claim 5, wherein the unblocking condition comprises routing of time-series data to the queue to be processed before the time-series datum according to the ordering definition.

7. The method of claim 5, wherein the unblocking condition comprises a maximum blocking time for the queue.

8. The method of claim 5, wherein processing of the time-series data is independent of processing of time-series data routed to respective queues of the plurality of queues other than the queue.

9. The method of claim 5, further comprising:
   blocking processing of the time-series datum until the processing condition of the request is satisfied.

10. The method of claim 9, further comprising:
    maintaining a history of processing of time-series data including the time-series datum for the queue.

11. The method of claim 5, wherein the partitioning definition comprises a client-defined partitioning key based at least in part on one or more attributes of the time-series datum.

12. The method of claim 5, wherein the workflow is implemented as part of a database service in a multi-tenant service provider network.

13. One or more non-transitory computer-accessible storage media storing program instructions that when executed on or across one or more computing devices cause the one or more computing devices to implement a scheduling service to perform:

creating an execution pipeline to process time-series data responsive to receipt of a request comprising a sharding definition and an ordering definition;
receiving a time-series data sample for processing by the workflow;
routing the time-series data sample to a queue of a plurality of queues according to the sharding definition;
identifying that the time-series data sample has been routed to the queue out of order according to the ordering definition; and
blocking execution of the time-series data sample until satisfaction of an unblocking condition is determined.

14. The one or more non-transitory computer-accessible storage media of claim 13, wherein the unblocking condition comprises routing of time-series data to the queue to be executed before the time-series data sample according to the ordering definition.

15. The one or more non-transitory computer-accessible storage media of claim 13, wherein the unblocking condition comprises a maximum blocking time for the queue.

16. The one or more non-transitory computer-accessible storage media of claim 13, wherein executing of the time-series data sample is independent of executing of time-series data routed to respective queues of the plurality of queues other than the queue.

17. The one or more non-transitory computer-accessible storage media of claim 16, wherein the request further comprises an execution definition, and wherein the scheduling service further performs:
blocking execution of the time-series data sample until the execution condition is satisfied.

18. The one or more non-transitory computer-accessible storage media of claim 17, wherein the scheduling service further performs:
maintaining a history of execution of time-series data including the time-series data sample for the queue.

19. The one or more non-transitory computer-accessible storage media of claim 13, wherein the sharding definition comprises a client-defined sharding key based at least in part on one or more attributes of the time-series data sample.

20. The one or more non-transitory computer-accessible storage media of claim 13, wherein the scheduling service and the execution pipeline are implemented as part of a database service in a multi-tenant service provider network.

\* \* \* \* \*